United States Patent
Kulcinski et al.

(10) Patent No.: US 10,126,458 B2
(45) Date of Patent: Nov. 13, 2018

(54) SYSTEM FOR DETECTION OF CLANDESTINE MATERIALS PROVIDING HIGH STANDOFF

(71) Applicant: Wisconsin Alumni Research Foundation, Madison, WI (US)

(72) Inventors: Gerald Kulcinski, Madison, WI (US); John Santarius, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 327 days.

(21) Appl. No.: 15/018,268

(22) Filed: Feb. 8, 2016

(65) Prior Publication Data

US 2017/0227669 A1    Aug. 10, 2017

(51) Int. Cl.
*G01V 5/02* (2006.01)
*G01V 5/00* (2006.01)

(52) U.S. Cl.
CPC .......... *G01V 5/0016* (2013.01); *G01V 5/0069* (2016.11); *G01V 5/0083* (2013.01)

(58) Field of Classification Search
CPC ......... B64C 39/024; B64C 11/46; G06T 7/70; G06T 7/00; G01T 3/00
USPC ........... 250/580, 393, 491.1, 390.01, 390.12, 250/390.1
See application file for complete search history.

(56) References Cited

U.S. PATENT DOCUMENTS

| | | | |
|---|---|---|---|
| 7,750,802 B1* | 7/2010 | Parish | G01N 21/64 250/370.01 |
| 2009/0095895 A1* | 4/2009 | Dent | H05H 3/06 250/251 |
| 2011/0077799 A1* | 3/2011 | Barnes | G01T 7/00 701/2 |
| 2011/0233419 A1* | 9/2011 | Norris | G01V 5/0008 250/390.04 |
| 2017/0293036 A1* | 10/2017 | Farsoni | G01T 1/2018 |

OTHER PUBLICATIONS

Xu et al., "Graphene fiber: a new trend in carbon fibers," Materials Today, vol. 18, No. 9, published Nov. 2015; Retrieved from the internet [Feb. 25, 2018]; Retrieved from url <https://doi.org/10.1016/j.mattod.2015.06.009>.*

Slaughter, "Detecting terrorist nuclear weapons at sea: The 10th door problem,": U.S. Department of Energy by Lawrence Livermore NationW Laboratory under Contract DE-AC52-07NA27344; pp. 1-17; (Oct. 2008): US.

* cited by examiner

*Primary Examiner* — Yara B Green
(74) *Attorney, Agent, or Firm* — Boyle Fredrickson, S.C.

(57) ABSTRACT

A system for detecting clandestine materials employs a lightweight neutron-source that can be mounted to a remotely controlled mobile platform for flexible and high standoff scanning of possibly explosive materials. In one embodiment, aerial drones hold the neutron-source and detectors for highly flexible remote scanning.

19 Claims, 5 Drawing Sheets

SYSTEM FOR DETECTION OF CLANDESTINE MATERIALS PROVIDING HIGH STANDOFF

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to a method of detecting clandestine materials, such as explosives, providing high standoff, that is, a large separation between the possible explosive and targets that might be injured.

It is important to be able to identify explosive materials, for example, at ports of entry into a country, where they may be hidden in incoming vessels or in the battlefield where they may represent a hidden stockpile or components of an explosive device such as a land mine. Explosive materials can include chemical explosives, nuclear weapons, and special nuclear material (SNM), including highly enriched uranium (HEU) any of which may form the basis of a bomb. Keeping humans and other targets at a significant distance from explosives while identifying these materials presents a significant challenge generally termed "standoff".

Current explosive detection systems are relatively large devices and difficult to move and position thus requiring materials being reviewed to be brought into the port or population center that could be damaged by any explosive device and/or making them unsuitable for mobile field use, for example, in the battlefield.

SUMMARY OF THE INVENTION

The present invention combines a lightweight, neutron source together with sensors for detecting emitted particles stimulated by the neutrons with a highly mobile platform such as rotary wing drones. In one embodiment, power would be beamed to operate the neutron source using radio-frequency (RF) waves, lasers or other beamed-power options. In combination, the system permits material detection on ships before docking and/or over terrain containing possible landmines or improvised explosive devices (IEDs), at distances safely removed from human operators and inhabited areas.

More specifically, in one embodiment, the invention provides a system for the detection of clandestine materials using at least one remotely guided platform operable to traverse a region holding clandestine materials. The remotely guided platform includes: (a) an inertial electrostatic neutron source providing neutrons that, depending on the geometry of the source, have approximately constant flux near the source or fall off toward the region under interrogation approximately either linearly or as distance squared; (b) at least one radiation detector for receiving radiation from the region of interest stimulated by the beam of neutrons; and (c) telemetry for communicating signals from the radiation detector to a remote station indicating a detection of clandestine materials.

It is thus a feature of at least one embodiment of the invention to provide a highly mobile neutron-source and detector system for flexible remote sensing with high standoff.

The remotely guided platform may be an unmanned neutron-source aircraft such as a rotorcraft and the telemetry may communicate signals from the remote control station to guidance systems on the neutron-source rotorcraft for remote guidance of the neutron-source rotorcraft.

It is thus a feature of at least one embodiment of the invention to provide a neutron source and detector system that can be transported by lightweight aircraft (drones) permitting scanning of terrain, vehicles at border crossings, ships in harbors and the like with high degrees of standoff from population centers. The rapid maneuvering possible with drones also makes it practical to scan the area before moving convoys of military vehicles or the like.

The neutron-source rotorcraft may further include a power reception antenna for receiving wireless power transmissions from a remote station providing power to the inertial electrostatic neutron source.

It is thus a feature of at least one embodiment of the invention to provide the necessary power requirements of the inertial electrostatic neutron source facilitating the integration of the neutron source with a mobile airborne platform.

The system may further include a power-relay rotorcraft providing a relay redirecting the wireless power transmissions from the remote station to the neutron-source rotorcraft to provide power to the inertial electrostatic neutron source without line-of-sight communication between the remote station and the neutron-source rotorcraft.

It is thus a feature of at least one embodiment of the invention to permit non-line-of-sight operation of the system, for example, as protected from explosive detonations by intervening terrain or structures or permitting operation of the scanning system within cargo holds of ships, between cargo containers, or the like.

The system may use multiple sensor rotorcrafts each holding radiation detectors movable independently of the neutron-source rotorcraft and including the telemetry.

It is thus a feature of at least one embodiment of the invention to permit highly flexible sensing both of radiation immediately stimulated upon exposure of a clandestine material to neutrons by coordinating movement of the neutron-source rotorcraft in tandem with movement of the sensor rotorcrafts, and of delayed radiation, for example, related to fissile materials, by independently scanning the sensor rotorcraft behind the neutron-source rotorcraft.

At least one second platform may include steerable collimators for preferentially receiving radiation along a predetermined orientation with respect to at least one second platform and communicating that orientation by telemetry to the remote station.

It is thus a feature of at least one embodiment of the invention to permit the sensor rotorcrafts to provide angularly discriminated data such as may help triangulate sources of clandestine material.

The radiation detectors may include a detector selected from the group consisting of gamma and neutron detectors.

It is thus a feature of at least one embodiment of the invention to provide for multiple characterizing measurements of clandestine materials suitable for both chemical and fissile materials.

The inertial electrostatic confinement (IEC) neutron-source may provide an area neutron beam of at least 20 centimeters by 20 centimeters in cross-section taken perpendicular to a direction of desired interrogation. All points within an IEC neutron source will emit neutrons at roughly comparable rates, hut always isotropically. This means that there will not be a beam, but a source of neutrons that is approximately, constant for about the dimensions of a planar IEC neutron source (both above and below the plane); falls off linearly in the radial direction for a line-source IEC device; and falls off as distance squared from a point source or far from a spherical IEC neutron source.

It is thus a feature of at least one embodiment of the invention to provide an areal neutron-source having reduced neutron flux falloff with distance providing greater detection sensitivity distance and improved clearance between the mobile platform holding the neutron-source and terrain or other structure.

The inertial electrostatic neutron source may provide multiple pairs of cathode grids separated along the lateral dimensions perpendicular to the areal neutron source.

It is thus a feature of at least one embodiment of the invention to permit the generation of an areal neutron source through the combination of multiple linear sources or a configuration using long, thin IEC electrodes within a rectangular prism (box configured as a nearly flat panel) containing the fuel gas.

The pairs of cathode grids may be held in low-pressure regions and separated from higher pressure regions holding gaseous hydrogen isotopes generating neutrons.

It is thus a feature of at least one embodiment of the invention to provide a reduced volume neutron-source through the use of variable gas densities.

The low-pressure regions and high-pressure regions may be separated by a thin-membrane, pressure-resistant gas barrier that allows fast neutrals to pass without significant reduction in energy.

It is thus a feature of at least one embodiment of the invention to provide a low energy mechanism for separating high-pressure and low-pressure zones while allowing transmission of neutrons.

The nearly transparent barrier to fast neutrals can be selected from graphene, boron nitride, or borophene membrane, or a comparable thin, nearly 2D material.

It is thus a feature of at least one embodiment of the invention to provide a strong pressure-resistant and lightweight barrier material presenting minimal interference and damage by the passage of neutrals.

These particular objects and advantages may apply to only some embodiments falling within the claims and thus do not define the scope of the invention.

DETAILED DESCRIPTION OF THE PREFERRED EMBODIMENT

Figure 1:
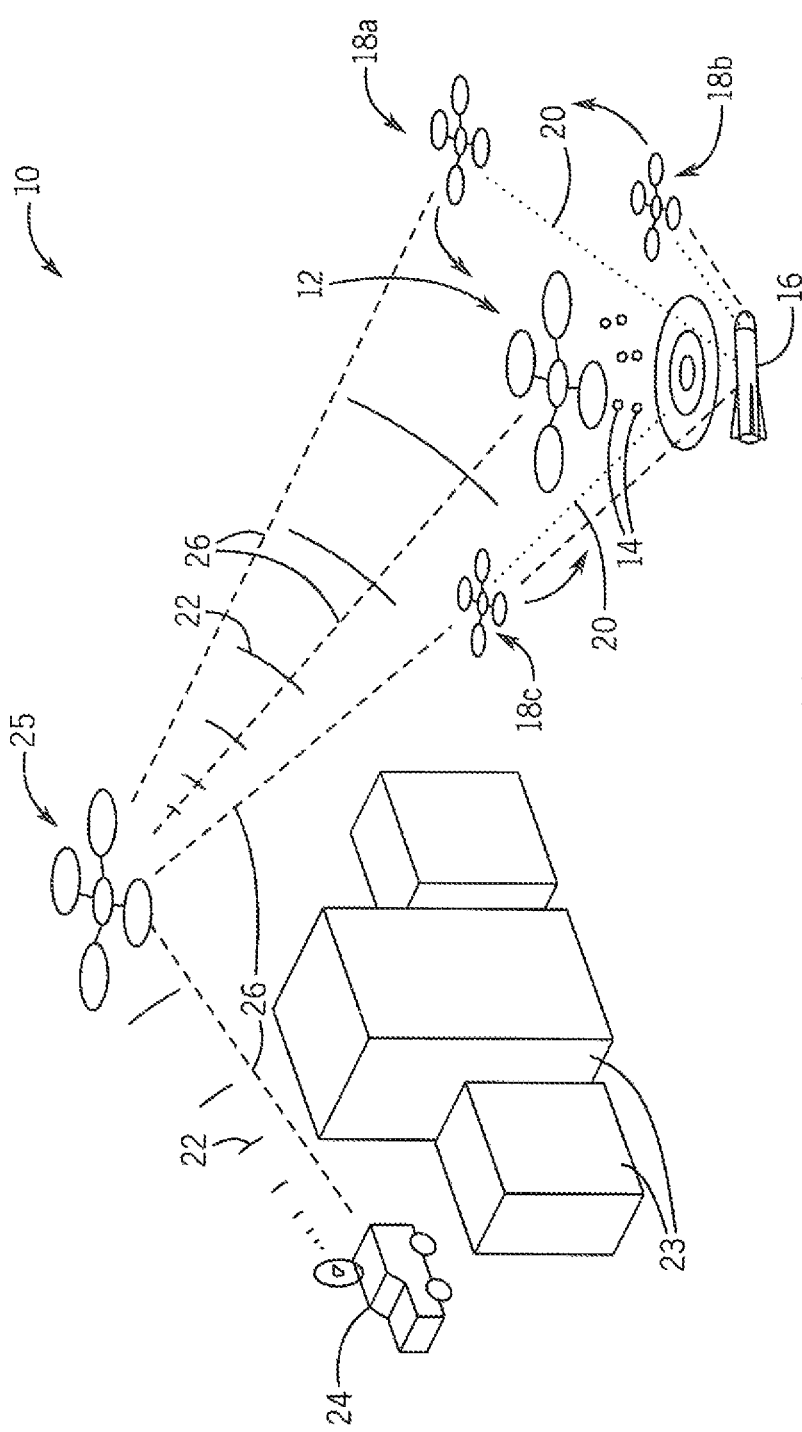
FIG. 1 is a simplified perspective view of the invention as configured to identify buried clandestine materials and using multiple drone aircraft holding a neutron-source, detectors, and providing for power relay functions.

Referring now to FIG. 1, a system 10 for the identification of clandestine materials may employ a remotely controlled neutron-source drone 12 producing neutrons 14, some of which move downward into the earth to stimulate the generation of radioactive particles in a buried clandestine material 16. The clandestine material 16 may be, for example, chemical explosives or fissile material.

A set of sensor drones 18a-18c (typically three or more sensor drones 18) may circle or follow the neutron-source drone 12 to received radiation 20 from the clandestine material 16 stimulated by the neutrons 14. The sensor drones 18 may typically be separated from the clandestine material 16 by 1-5 meters, and the neutron-source drone 12 may be separated from the clandestine material 16 by 1-3 meters. Identification of the received radiation 20 by the sensor drones 18 may be used to characterize the elemental and, possibly, chemical composition of the clandestine material 16.

Power for the operation of the sensor drones 18 may be provided by self-contained batteries or another energy source, or alternatively power for both the neutron-source drone 12 and sensor drones 18 may be derived all or in part from a microwave beam 22 broadcast from a manned remote station 24. The microwave power supply may, for example, be a 2.45 gigahertz signal. In this case, the manned remote station 24, for example, may be a truck holding a microwave transmitter providing the line-of-sight microwave beam 22 to a relay drone 25. The relay drone 25 in turn may relay the microwave beam 22 around obstructing and possibly shielding elements 23, for example, buildings or terrain, to the neutron-source drone 12 and sensor drones 18. Some of the microwave beam 22 from the remote station 24 may also be used to power the relay drone 25, or the relay drone 25 may be powered by self-contained batteries or another suitable power source, for example, a combustion engine.

Telemetry radio signals 26 providing navigational information and returning radiation-characterizing information from the sensors in the sensor drones 18 may also be relayed in a line-of-sight fashion between the neutron-source drone 12 and the sensor drones 18 and the remote station 24 through the relay drone 25. The use of wireless data transmission and power transmission permits a standoff of 100 to 1000 meters to be obtained between the remote station 24, for example, having a human operator, and the neutron-source drone 12 and sensor drones 18.

Figure 2:
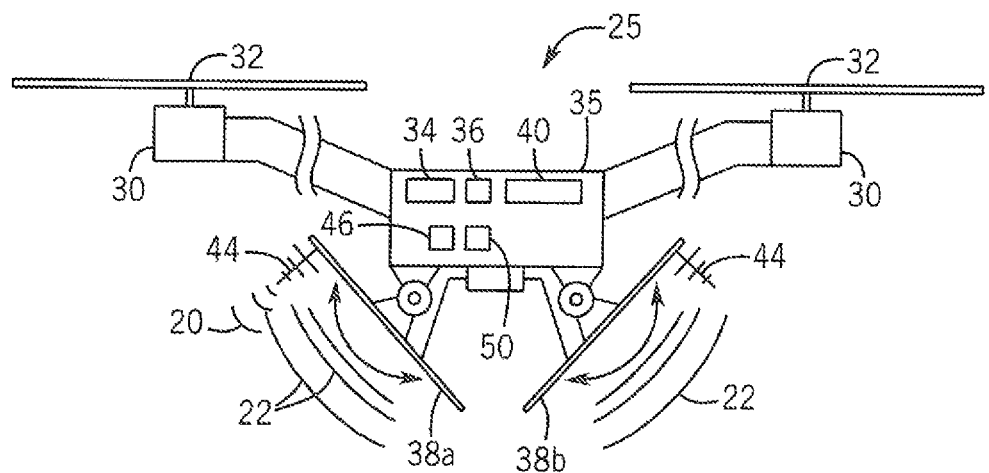
FIG. 2 is a simplified fragmentary elevational view of the drone of FIG. 1 providing power relay functions.

Referring now to FIG. 2, the relay drone 25, like the neutron-source drone 12 and sensor drones 18, may be implemented by unmanned aerial vehicles (UAVs), for example, multiple rotorcraft. For example, the relay drone 25 may provide multiple electric motors 30 outwardly and upwardly cantilevered from a central body 35, the electric motors 30 having vertically oriented shafts connected to corresponding rotor propellers 32 providing an upward thrust supporting the relay drone 25. A controller 35, for example, provided by an electronic computer executing a stored program, may communicate with orientation and location sensors 36, for example, including a three-axis accelerometer and gyroscope and GPS receiver, allowing stable flight and navigation by controlling the electrical power to each of the motors 30 to steer and position the relay drone 25.

Supported within the central body 35 are independent wireless power conversion and conditioning circuitry, and supported below the central body 35 are transfer antennas 38a and 38, for example, providing for rectenna-type designs tuned to the microwave beam 22. In operation, power transfer antenna 38a receives microwave beam 22 from the remote station (shown in FIG. 1) and rectifies it to provide for DC power to a contained power management unit 40 used for supplying motive power to the motors 30 and other components of the relay drone 25. Power management unit 40 also generates microwave power from stored DC power to provide a microwave beam 22 radiated from power transfer antenna 38b to the neutron-source drone 12 and sensor drones 18 as discussed above.

Each of the power transfer antennas 38 may also include a telemetry antenna 44 for serving as a relay for telemetry radio signals 26 as discussed above using a telemetry transceiver 46 thereby making use of the same aiming mechanism used for the power transfer antennas 38. An antenna servo controller 50 may provide for angulation of the power transfer antennas 38 to permit optimal line-of-sight communication between the relay drone 25 and the remote station 24 and neutron-source drone 12 and sensor drones 18.

Relay drone 25 may be manually controlled from the remote station 24 via telemetry radio signals and/or may operate autonomously according to the sensed locations of the remote station 24, neutron-source drone 12 and sensor drones 18 received from telemetry radio signals 26 to provide necessary power transmission. It will be appreciated that the power transfer antenna 38a and 38b and the intervening electronics together provide a power relay. In an alternative embodiment, the relay drone 25 may hold a microwave reflector to provide a power relay. Alternatively, a high power laser from the remote station 24 may be used to transfer power via a reflector on the relay drone 25 to receiving photoelectric cells on the neutron-source drone 12 and/or sensor drones 18.

Figure 3:
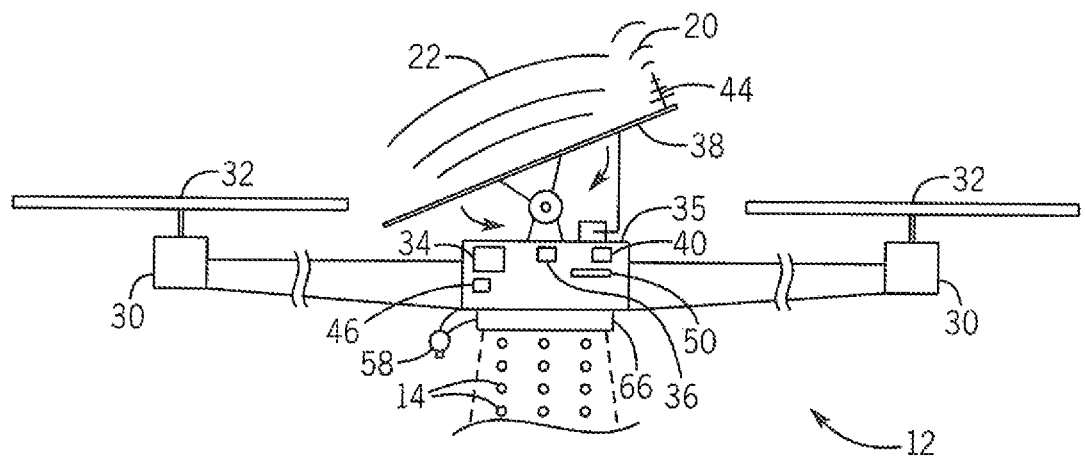
FIG. 3 is a figure similar to that of FIG. 2 showing the drone of FIG. 1 for detecting radiation stimulated by the neutron beam.
Figure 4:
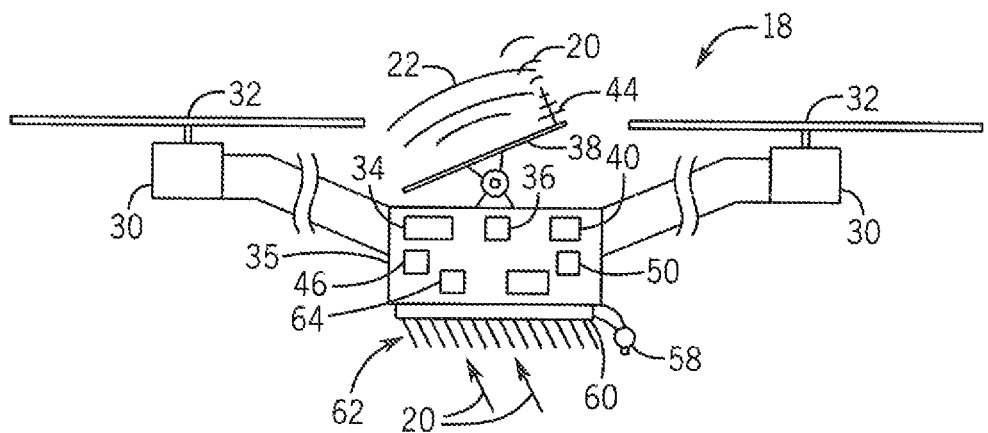
FIG. 4 is a figure similar to that of FIG. 2 showing the drone of FIG. 1 for holding the neutron-source.

Referring now to FIG. 3, the sensor drones 18 may have a similar construction to the relay drone 25, however, with the power transfer antenna 38 mounted on top of the central body 35 for improved communication with the relay drone 25. Positioned on the underside of the central body 35 of each sensor drone 18 is a sensor array 60 that may hold one or more gamma sensors and neutron sensors. The gamma sensors will detect radiation (gamma rays) primarily from chemical explosives (for example, nitrogen) in the clandestine material 16 and the neutron detector will detect neutrons from fissile components in the clandestine material 16. Neutrons can be detected, for example, using $^3$He or LiF detectors. For $^6$Li (7.6% abundance) detectors, detection occurs via high cross-section thermal neutron reactions; for $^6$Li (7.6% abundance) detectors detection occurs via low cross-section, fast-neutron reactions. Gamma rays may be detected using NaI or other suitable detectors.

The detector signals from the sensor array 60 as forwarded to the remote station 24 may be processed using sparse signal or other computer algorithms for confident prediction of the presence of clandestine materials 16.

A multi-blade collimator 62 may be positioned below the sensor array 60 and controlled by servo actuator 64 to provide control over an angle of sensitivity of the sensor array 60, for example, to focus the sensor array on a particular area. The multi-blade collimator 62, in one embodiment, may provide for an angle of sensitivity adjustment with respect to a vertical plane and a rotational adjustment with respect to a vertical axis so that an arbitrary area of the ground terrain may be examined for gamma rays simply by repositioning the multi-blade collimator 62.

The sensor drones 18 may further include a video camera 58 that may be controlled to align with the direction of the collimator 62 to provide a visual reference with respect to the source of received radiation 20. This visual reference may be used to create a superimposed image at the remote station 24 showing a terrain or other image as visible to the human eye superimposed on a radiation image.

Referring now to FIG. 3, a neutron-source drone 12 may be substantially identical to the sensor drone of FIG. 3 with the exception of being more powerful to carry a larger power transfer antenna 38 needed for receiving power sufficient for the neutron-source 66. The neutron-source drone 12 also may omit a sensor array 60 and collimator 62 in favor of the neutron-source 66 positioned below the central body 35 having a broad face facing downward when the neutron-source drone 12 is in flight. Alternatively, but not shown) the neutron source 66 may be suspended to with the broad face directed sideways, for example, as may be useful for inserting the neutron source 66 within narrow gaps between cargo containers. Like the other drones, the neutron-source drone 12 may also receive telemetry through a telemetry antenna 44 for the control of the neutron-source (turning it on and off) and navigation of the neutron-source drone 12.

All drones provide for GPS or other triangulation capabilities so that location information may be transmitted to the remote station 24 when the drone is out of visual range.

Figure 5:
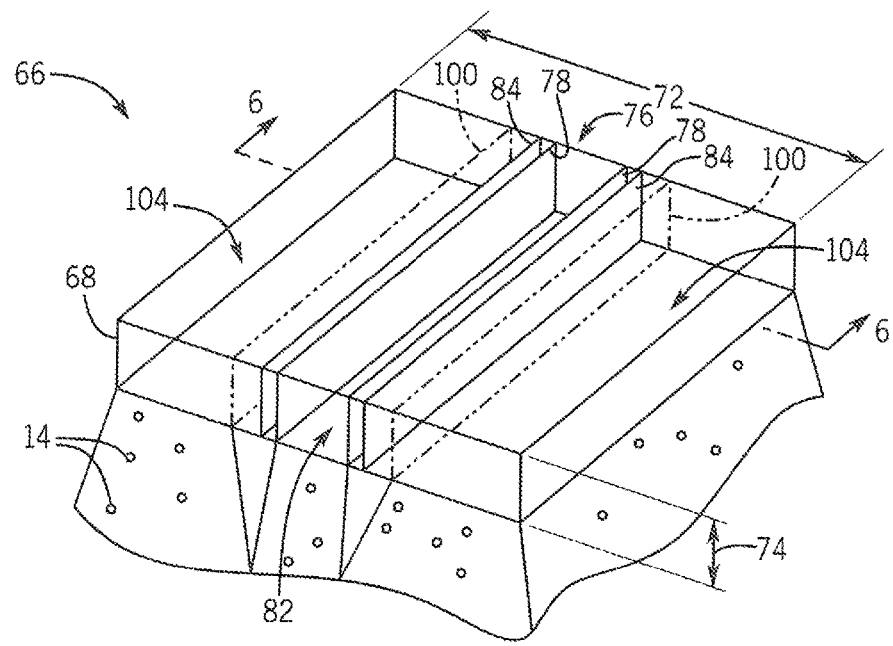
FIG. 5 is a perspective view of the neutron-source of FIG. 4 in phantom showing the use of neuron emissions that merge to provide an areal beam.

Referring now to FIG. 5, in one embodiment, the neutron source 66 may generally comprise a rectangular housing 68 having a length 70 and width 72 providing its longest dimensions and generally extending horizontally during flight and a thickness 74 comprising a shortest dimension and generally aligned with the average direction of propagation of neutrons 14 toward clandestine material 16. Desirably, length 70 and with 72 are such as to provide an areal source of neutrons overcoming the normal inverse square falloff of neutrons 14 from a point source for inverse falloff of neutrons 14 from a line source. For example, the length 70 and width 72 may be in excess of 20 centimeters and possibly in excess of one meter each.

Ideally, the housing 68 is constructed of a lightweight insulating composite material strong enough to resist pressure forces as will be described, such as may be constructed of a carbon fiber polymer composite material or a flexible gas impermeable fabric. In this respect, the housing 68 may define an airtight interior rectangular space substantially equal to the size of the housing 68 discussed above.

Figure 6:
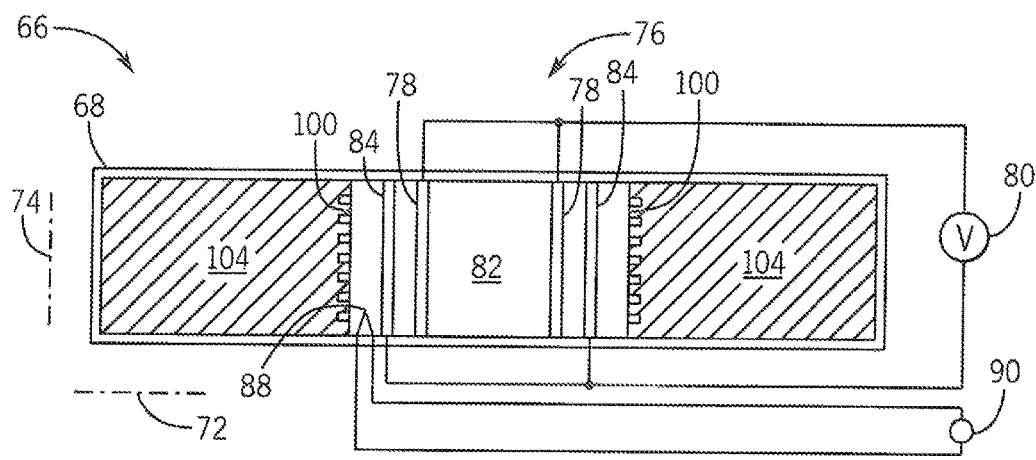
FIG. 6 is a simplified cross-section along line 6-6 of FIG. 5 showing electrical connection of internal grids of the neutron-source and regions of low and high pressure.

Referring also to FIG. 6, within the housing 68, one or more electrode sets 76 may be positioned spaced along the width 72 and running in parallel orientation between ends of the housing 68 opposed along its length 70. The following description will consider a single electrode set 76. The electrode set 76 includes four vertically extending and mutually parallel, planar, electrically-conductive grids that are each substantially transparent to ions and neutral particles (e.g., at least 80 percent transparent). Two inner grids provide cathode grids 78 connected to a positive terminal of a high-voltage power supply 80 (communicating with the power management unit 40), for example, having a voltage of 10 to 300 kilovolts.

The cathode grids 78 may be centered about central region 82 associated with each electrode set 76 extending parallel to the length 70. To the left and right of the cathode grids 78 (along the width 72) and flanking the cathode grids 78 for each electrode set 76, are anode grids 84 connected to the negative terminal of the high-voltage power supply 80 parallel to but spaced from the cathode grids 78 and these define the oscillation region 86.

Positioned slightly beyond at least one anode grid 84 for the electrode set 76 is an electron source 88, for example, a thermionic electron source that ionizes background fuel gas and produces positive ions. This electron source 88 may be powered by a separate heater supply 90 of lower voltage. Alternatively, hydrogen isotopes of deuterium embedded in an electrically resistive metal matrix heated by the passage of current therethrough may be released into the ion source region beyond the anode.

Figure 7:
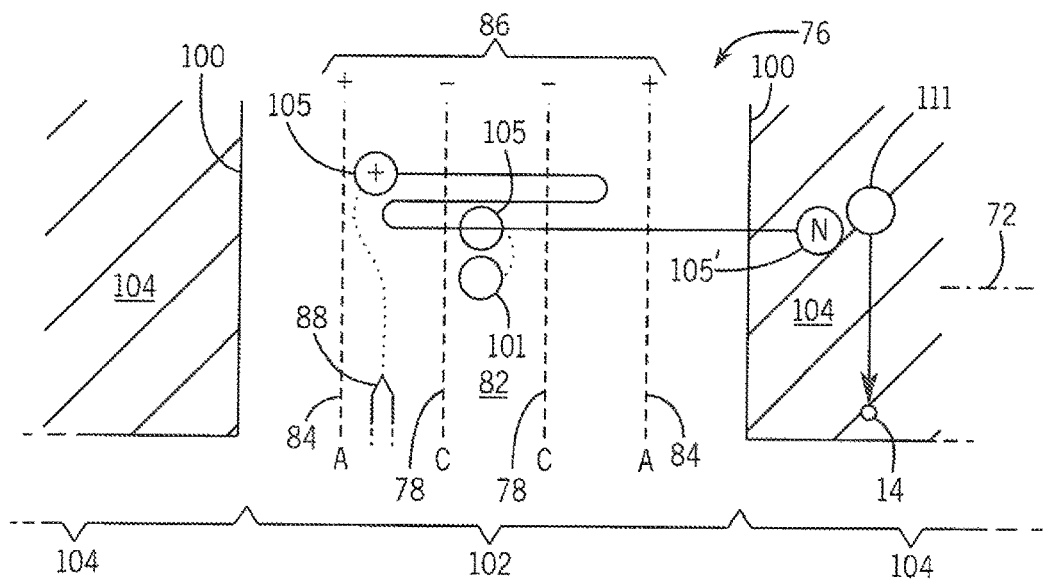
FIG. 7 is a simplified view of the grids of FIG. 6 showing the evolution of a charged ion into a neutral for the production of neutrons.

Referring also to FIG. 7, to the left and right of each electrode set 76 is a physical pressure resistant barrier membrane 100. This membrane 100 may be gas impermeable, however, some minor leakage is acceptable such as can be overcome by pumping or simply ignored. The membrane 100 extends to be generally parallel to the cathode grids 78 and anode grids 84 and is constructed to be largely transparent to neutral particles as will be discussed below. Importantly, the barrier membranes 100 partition the housing 68 internally to create low-pressure regions 102 encompassing the electrode set 76 of cathode grids 78 and anode grids 84 typically having a pressure of 1 to 10 millitorr. These low-pressure regions 102 will hold some low-pressure non-ionized (neutral) tritium or deuterium gaseous molecules 101, and this will also be the region where the ions produced by the electron source 88 will be accelerated and decelerated, passing between the electrode sets 76 although some fusion may also take place producing neutrons as discussed below.

To the left and right of the barrier membranes 100 of each electrode set 76, are high-pressure regions 104, for example, of pressures possibly higher than atmospheric pressure and, for example, 10 atmospheres. The gas of the high-pressure region 104 will be formed of gaseous state hydrogen isotopes 111, for example, tritium and deuterium. These high-pressure regions 104 provide for target regions between each electrode set 76 that may be used to generate neutrons and on both sides of each electrode set 76. By providing a high-pressure gas in the high-pressure regions 104, the size of the housing 68 may be greatly reduced. In an alternative embodiment, the neutral gas pressure in regions 104 could be kept equal to the neutral gas pressure in region 102. In all embodiments, the size of the regions 104 could be optimized for the most efficient neutron production.

During operation, and as best seen in FIG. 7, the ions created by the electron source 88 may create a positively charged ion 105 that drifts into the space between an anode grid 84 and cathode grid 78 of each electrode set 76. Electrical fields on the cathode grids 78 and anode grids 84 will cause the ion to accelerate rapidly toward central region 82 passing (typically) through the cathode grids 78 and oscillating in region 86 held captive within the repulsive forces of the electrostatic potential difference between the cathode and anode.

During these oscillations, the charged ion 105 may pass in proximity to a neutral molecule 101 and transfer its charge to the neutral molecule 101 so that the charged ion 105 becomes a neutral 105'. This accelerated neutral 105', no longer affected by the voltages on the cathode grids 78 or anode grids 84, may pass outward along the width 72 to travel through the barrier membranes 100 into the high-pressure region 104.

The greater density of targets in the high-pressure region 104 make a fusion event between the neutral 105' and gaseous state hydrogen isotopes 111 statistically more likely. Each fusion event produces ejected neutrons 14 according to the reactions (1) or (2):

$$D+T => n(14.07 \text{ MeV})+4He(3.52 \text{ MeV}) \tag{1}$$

$$D+D => n(2.45 \text{ MeV})+3He(0.82 \text{ MeV})\{50\%\} \tag{2}$$

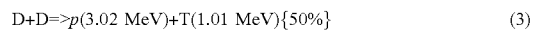
$$D+D => p(3.02 \text{ MeV})+T(1.01 \text{ MeV})\{50\%\} \tag{3}$$

The letters D and T in chemical reaction equations (1)-(3) refer to individual neutrals 105 in a collision with a gaseous state isotope 111. The T produced by the reaction in equation (3) can subsequently react with a D via equation (1), thereby producing a neutron.

Many (roughly half) of the resulting neutrons 14 pass downward out of the neutron-source 66 through a bottom wall of the housing 68.

Figure 8:
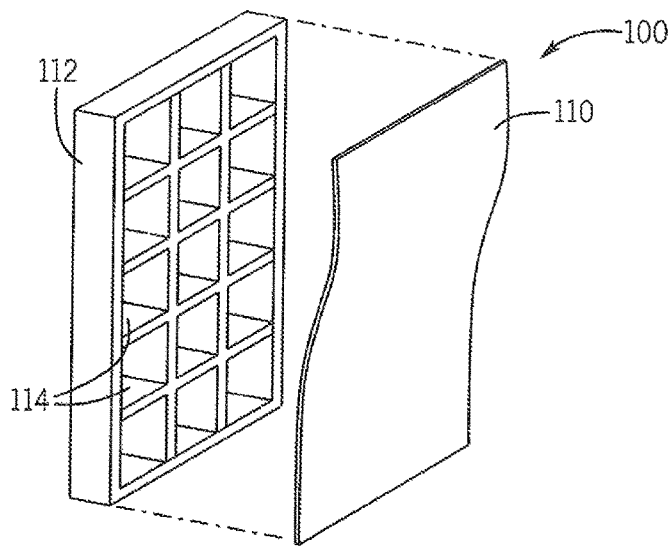
FIG. 8 is an exploded perspective view of a pressure barrier placed between the regions of high and low pressure of FIG. 6.

Referring now to FIG. 8, barrier membranes 100, for example, may be a thin film of graphene 110 (1-5 layers) or other similar material such as molybdenum disulfide, boron nitride, or borophene membrane, supported on a perforated substrate material 112, for example, a silicon wafer pattern to provide a set of openings 114. The substrate material 112 supports the graphene 110 while preserving a high degree of transparency to neutrals (50-80 percent, possibly more). The graphene 110 may be grown on the substrate 112, for example, by chemical vapor deposition or similar techniques.

Referring again to FIG. 5 and FIG. 7, within the rectangular housing of neutron source 66 (FIG. 5), each point within the neutral gas target region 104 (FIG. 7) will produce an approximately equal rate of isotropically distributed neutrons, and each point within the ion oscillation region 102 (FIG. 7) will produce a possibly different rate of isotropically distributed neutrons. The combined result of these isotropically produced neutrons within the rectangular housing 68 provides a substantially areal emission of neutrons 14 for distances comparable to the length 70 (FIG. 5) and width 72 (FIG. 5) of the neutron source 66.

Figure 9:
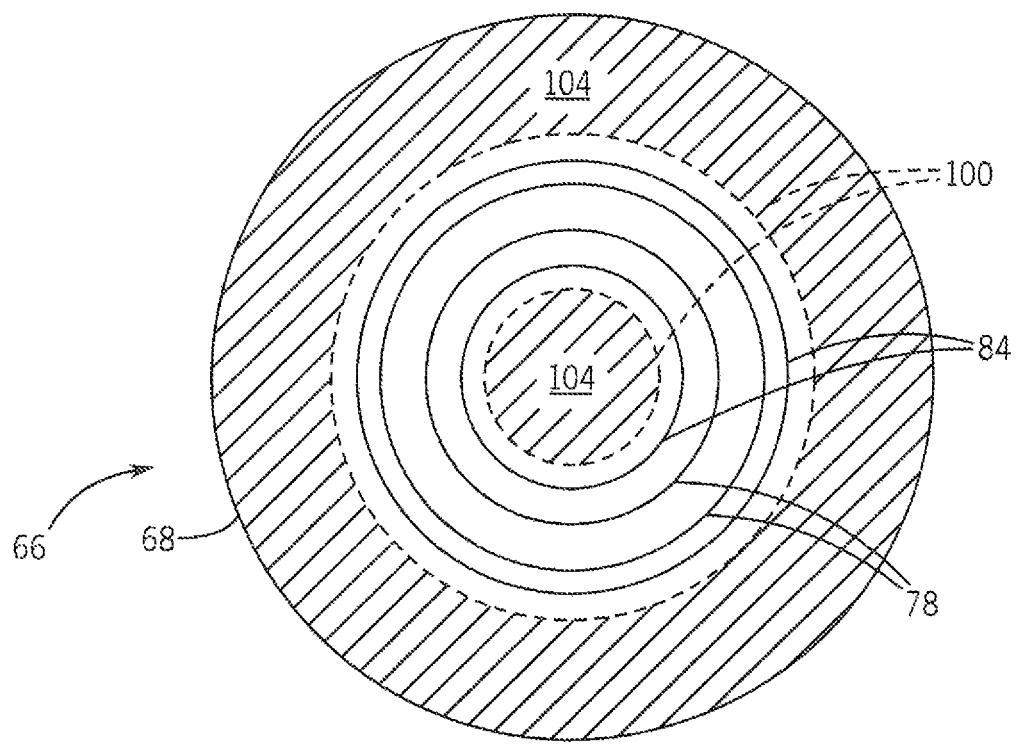
FIG. 9 is a top plan view in phantom of an alternative grid configuration for the neutron-source of FIG. 6.

Referring now to FIG. 9, it will be appreciated that the electrode sets 76 need not be linear but can, for example, be arranged in a circular pattern to provide various rings of neutron emissions in regions 104 that together provide areal beam of neutrons.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will be appreciated generally that the sensor drones and neutron-source drones can be combined in a single drone of larger capacity and further that the drones may be supplemented or augmented terrestrial vehicles, for example, operated by remote control using tires or treads to maneuver. In the case of detecting materials on incoming oceangoing ships, portions of the invention may be carried by remote controlled surface or subsurface autonomous boats.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A system for the detection of clandestine materials comprising:
   at least one remotely guided platform operable to traverse a region holding clandestine materials, the remotely guided platform providing:
   (a) an inertial electrostatic neutron-source providing a beam of neutrons irradiating the region under interrogation;
   (b) at least one radiation detector for receiving radiation from the region of interest stimulated by the beam of neutrons; and
   (c) telemetry for communicating signals from the radiation detector to a remote station indicating a detection of clandestine materials.

2. The system of claim 1 wherein the at least one remotely guided platform is an unmanned neutron-source aircraft and wherein the telemetry communicates signals from the remote station to guidance systems on the neutron-source aircraft for remote guidance of the neutron-source aircraft.

3. The system of claim 2 wherein the neutron-source aircraft is a rotorcraft including a power reception antenna for receiving wireless power transmissions from a remote station providing power to the inertial electrostatic neutron-source.

4. The system of claim 1 further including a power-relay rotorcraft providing a relay redirecting the wireless power transmissions from the remote station to the neutron-source rotorcraft to provide power to the inertial electrostatic neutron-source without line-of-sight communication between the remote station and the neutron-source aircraft.

5. The system of claim 1 further including multiple sensor rotorcrafts each holding radiation detectors movable independently of the neutron-source rotorcraft and including the telemetry.

6. The system of claim 1 wherein the remotely guided platform includes a first platform holding the inertial electrostatic neutron-source and at least one second platform holding the at least one radiation detector and telemetry, the first platform and second platform being independently movable.

7. The system of claim 6 wherein the at least one second platform includes steerable collimators for preferentially receiving radiation along a predetermined orientation with respect to the at least one second platform and communicating that orientation by Hall telemetry to the remote station.

8. The system of claim 1 wherein the at least one radiation detector includes a detector selected from the group consisting of gamma and neutron detectors.

9. The system of claim 1 wherein the inertial electrostatic neutron-source provides an areal neutron beam of at least 20 centimeters by 20 centimeters in cross-section.

10. The system of claim 9 wherein the inertial electrostatic neutron-source provides multiple pairs of cathode grids separated along a lateral dimension perpendicular to the areal neutron beam.

11. The system of claim 10 wherein the pairs of cathode grids are held in low-pressure regions and separated from higher pressure regions holding gaseous hydrogen isotopes generating neutrons.

12. The system of claim 11 wherein the low-pressure regions and high-pressure regions are separated by a pressure-resistant gas barrier that allows fast neutrals to pass without substantial reduction in energy.

13. The system of claim 12 wherein the pressure-resistant gas barrier is a graphene membrane.

14. An areal neutron-source comprising:
   a chamber providing a low-pressure section separated from a higher pressure section by a substantially neutral transparent membrane;
   a set of electrical grids positioned in the low-pressure section and providing openings for a passage of ions therethrough, at least two electrical grids of the set each having a voltage difference providing a repulsive force on the ions and spaced apart to define a trap region therebetween trapping the ions; and
   a high-voltage power supply applying voltage to accelerate ions into the trap region to create high-energy ions oscillating within the trap region;
   wherein the low-pressure region includes neutrals interacting with the high-energy ions to generate high-energy neutrals escaping from the trap region to pass into the higher pressure section; and
   wherein the higher pressure section includes gas atoms for fusing with the high-energy neutrals to create a neutron beam.

15. The system of claim 14 wherein the gas atoms are hydrogen isotopes selected from the group consisting of tritium and deuterium.

16. The system of claim 14 wherein the electrical grids are biased at a voltage of 10 to 300 kilovolts.

17. The system of claim 14 wherein the electrical grids and substantially neutral transparent membrane are greater than 50 percent open to ion and neutral passage.

18. The system of claim 14 wherein the low-pressure region has a pressure of 1 to 10 millitorr and wherein the higher pressure section has a pressure greater than one atmosphere.

19. The system of claim 14 wherein the substantially neutral transparent membrane is graphene comprising 1 to 5 atomic layers.

* * * * *